(12) United States Patent
Wright

(10) Patent No.: US 6,873,827 B1
(45) Date of Patent: Mar. 29, 2005

(54) METHOD AND APPARATUS FOR PROVIDING FEEDER CABLE INSERTION LOSS DETECTION IN A TRANSMISSION SYSTEM WITHOUT INTERFERING WITH NORMAL OPERATION

(75) Inventor: Jonathan Wright, Irving, TX (US)

(73) Assignee: Nokia Corporation, Espoo (FI)

( * ) Notice: Subject to any disclaimer, the term of this patent is extended or adjusted under 35 U.S.C. 154(b) by 156 days.

(21) Appl. No.: 09/161,789

(22) Filed: Sep. 28, 1998

(51) Int. Cl.$^7$ ................................................ H04B 17/00
(52) U.S. Cl. ..................... 455/67.4; 455/115; 455/129; 343/703
(58) Field of Search .............................. 455/226.1, 115, 455/562, 6.3, 9, 561, 572, 423, 424, 67.1, 114, 103, 128, 129, 66, 344, 347, 280, 282, 502, 67.2, 118; 324/627, 628, 601, 637–630, 641–646, 76.27, 76.19, 76.53, 650; 343/852, 860, 701, 703; 342/360, 374

(56) References Cited

U.S. PATENT DOCUMENTS

| | | | |
|---|---|---|---|
| 4,176,317 A | | 11/1979 | Manfreda |
| 5,493,304 A | * | 2/1996 | Lee et al. .................... 342/360 |
| 5,548,222 A | | 8/1996 | Jensen et al. |
| 5,548,820 A | | 8/1996 | Victorin |
| 5,678,208 A | * | 10/1997 | Kowalewski et al. ........ 455/115 |
| 5,737,316 A | * | 4/1998 | Lee .............................. 370/248 |
| 5,745,838 A | * | 4/1998 | Tresness et al. .............. 455/5.1 |
| 5,940,006 A | * | 8/1999 | MacLellan et al. ..... 340/825.44 |
| 5,949,380 A | * | 9/1999 | Swank, II .................... 343/703 |
| 5,977,779 A | * | 11/1999 | Bradley ....................... 324/638 |
| 6,002,247 A | * | 12/1999 | Watkins ........................ 324/66 |
| 6,005,891 A | * | 12/1999 | Chadwick et al. ........... 375/224 |
| 6,020,733 A | * | 2/2000 | Bradley .................... 324/76.23 |
| 6,021,315 A | * | 2/2000 | Telewski .................... 455/67.1 |
| 6,047,199 A | * | 4/2000 | DeMarco ..................... 455/572 |
| 6,060,888 A | * | 5/2000 | Blackham et al. ........... 324/601 |
| 6,104,934 A | * | 8/2000 | Patton et al. ................ 455/561 |

* cited by examiner

Primary Examiner—Daniel Hunter
Assistant Examiner—Pablo Tran
(74) Attorney, Agent, or Firm—Squire, Sanders & Dempsey L.L.P.

(57) ABSTRACT

A method and apparatus for measuring a change in the insertion loss of a transmission line in a communication system is disclosed. The method provides feeder cable insertion loss detection in a transmission system without interfering with normal operation. The method includes injecting a non-interfering signal at a predetermined frequency onto a cable providing normal operating signals to a narrowband device at a predetermined frequency, measuring the amplitude of the injected signal, measuring the amplitude of a reflected signal, the injected signal being reflected by the narrowband device and processing the amplitude of the injected signal and the amplitude of the reflected signal to derive a current insertion loss for the cable. In addition, the method further includes comparing the current insertion loss to a prior insertion loss and determining the cable to be defective when the current insertion loss differs from the prior insertion loss by a predetermined amount and replacing the cable when the current insertion loss differs from the prior insertion loss by the predetermined amount. The injecting further includes selecting a signal for injection having a frequency and power that does not interfere with the normal operating signals and which causes the signal to reflect back from the narrowband device. The frequency of the selected signal for injection causes the narrowband device to appear to the selected signal for injection as a short or an open. The narrowband device is an antenna, a low noise amplifier, a power amplifier, a filter or a RF-to-light converter for a fiber optic distribution network.

22 Claims, 3 Drawing Sheets

METHOD AND APPARATUS FOR PROVIDING FEEDER CABLE INSERTION LOSS DETECTION IN A TRANSMISSION SYSTEM WITHOUT INTERFERING WITH NORMAL OPERATION

BACKGROUND OF THE INVENTION

1. Field of the Invention

This invention relates in general to the performance monitoring of communication systems, and more particularly to a method and apparatus for measuring a change in the insertion loss of a transmission line in a communication system.

2. Description of Related Art

Cellular communication systems are experiencing tremendous growth in the global communication market place. This growth is fueling many research programs and expanding the technology opportunities for all manufacturers of cellular equipment.

To attract customers and obtain a larger market share, cellular providers are pushing features enabled by the system's purely digital nature, such as Caller ID and short messaging, a paging equivalent. To further obtain a larger market share, cellular providers have turned to reducing the cost of air time. Cutting prices can take many forms. For example, vendors can give more free minutes per month, charge less for additional minutes, charge nothing for the first minute of incoming calls, reduce monthly fees, eliminate long-term contracts—all tactics available to the established cellular vendors as well. For a provider, this leads to less revenue per customer, but more incentive for increasing the market share. Thus, any reduction in customer traffic due to network problems has a tremendous impact on revenues and profits.

Accordingly, cellular vendors must take every step to ensure the reliability of the cellular network to maximize customer traffic. One problem encountered by cellular operators is an increase in the measurable loss ($S_{21}$) of the feeder coax cable. The symptoms of loss via a deteriorated $S_{21}$ typically involves a reduction in Base Transceiver Station (BTS) traffic, an increase in the number of dropped calls and an increase in subscriber complaints.

Typical causes for an increase in feeder cable loss include water in the feeder cable, mechanical stress placed on the cable during instillation, temperature cycling of the cable, connector failure and the effects of UV light on the cable. To make matters worse this type of problem occurs gradually. This makes the detection of this problem much more difficult.

Current systems and methods for monitoring the performance of feeder cables involve the measurement of the reflected RF power from the transmitter at the frequency of the BTS operation. However, this method allows only for the detection of an impedance change in the cable ($S_{11}$) i.e. if the cable is no longer presented 50Ω to the BTS output connector or not. Current systems and methods for monitoring the performance of feeder cables do not directly measure the insertion loss of the feeder cable ($S_{21}$). Still, an increase in the insertion loss of a feeder cable may occur with no or very little change in the cables impedance, and therefore no indication of a change in the performance of the feeder cable will be detected by current systems and methods for measuring the performance of feeder cables.

It can be seen then that there is a need for a method and apparatus for detecting the presence of a deterioration in the cable insertion loss.

SUMMARY OF THE INVENTION

To overcome the limitations in the prior art described above, and to overcome other limitations that will become apparent upon reading and understanding the present specification, the present invention discloses a method and apparatus for measuring a change in the insertion loss of a transmission line in a communication system.

The present invention solves the above-described problems by providing a method and apparatus for providing feeder cable insertion loss detection in a transmission system without interfering with normal operation.

A method in accordance with the principles of the present invention includes injecting a non-interfering signal at a predetermined frequency onto a cable providing normal operating signals to a narrowband device at a predetermined frequency, measuring the amplitude of the injected signal, measuring the amplitude of a reflected signal, the injected signal being reflected by the narrowband device and processing the amplitude of the injected signal and the amplitude of the reflected signal to derive a current insertion loss for the cable.

Other embodiments of a system in accordance with the principles of the invention may include alternative or optional additional aspects. One such aspect of the present invention is that the method further includes comparing the current insertion loss to a prior insertion loss and determining the cable to be defective when the current insertion loss differs from the prior insertion loss by a predetermined amount.

Another aspect of the present invention is that the method further includes replacing the cable when the current insertion loss differs from the prior insertion loss by the predetermined amount.

Another aspect of the present invention is that the injecting further comprises selecting a signal for injection having a frequency and power that does not interfere with the normal operating signals and which causes the signal to reflect back from the narrowband device.

Another aspect of the present invention is that the frequency of the selected signal for injection causes the narrowband device to appear to the selected signal for injection as a short.

Another aspect of the present invention is that the frequency of the selected signal for injection causes the narrowband device to appear to the selected signal for injection as an open.

Another aspect of the present invention is that the narrowband device is an antenna.

Another aspect of the present invention is that the narrowband device is a low noise amplifier.

Another aspect of the present invention is that the narrowband device is a power amplifier.

Another aspect of the present invention is that the narrowband device is a filter.

Another aspect of the present invention is that the narrowband device is a RF-to-light converter for a fiber optic distribution network.

A transmission system providing operating signals to a narrowband device over a cable according to the present invention includes an injection coupler disposed at a position relative to the cable distal from the narrowband device, the coupler injecting a signal onto the cable, the injected signal being selected to have a frequency and power that does not interfere with the operating signals and which causes the signal to reflect back from the narrowband device, a forward port, coupled to the cable proximate the injection coupler, the forward port allowing an amplitude of the injected signal to be measured and a reference port, coupled to the cable proximate the injection coupler, the reference port allowing an amplitude of the reflected signal to be measured.

A cellular network according to the present invention includes a switching center for controlling the routing of calls in the cellular network, a plurality of a base stations, coupled to the switching center, each base station comprising a base station transceiver, a narrowband device, and a feeder cable coupling the narrowband device and the base station transceiver, each of the base stations further including an injection coupler disposed at a position relative to each of the feeder cables distal from the narrowband device, the coupler injecting a signal onto the feeder cable, the injected signal being selected to have a frequency and power that does not interfere with the operating signals and which causes the signal to reflect back from the narrowband device, a forward port, coupled to the feeder cable proximate the injection coupler, the forward port allowing an amplitude of the injected signal to be measured and a reference port, coupled to the feeder cable proximate the injection coupler, the reference port allowing an amplitude of the reflected signal to be measured.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a system and method for detecting a change in the performance characteristics of feeder cables by monitoring the feeder cables for a change in the insertion loss of the feeder cables.

Figure 1:
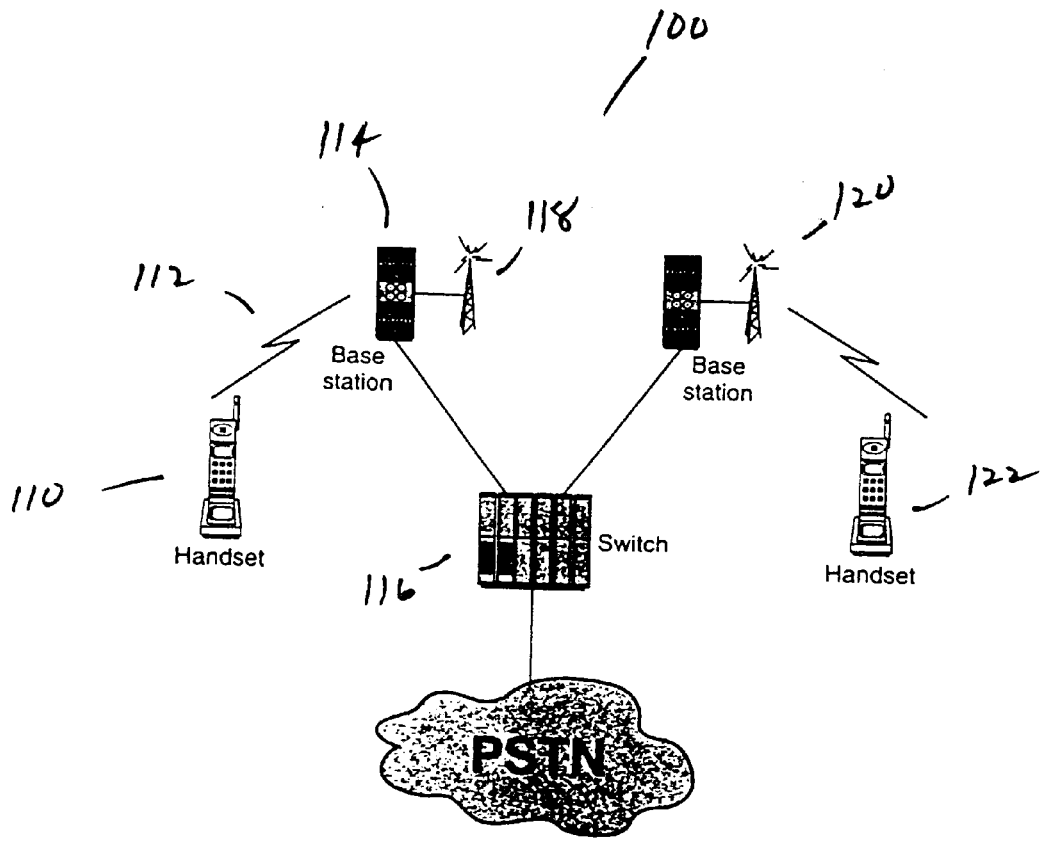
FIG. 1 illustrates a wireless telecommunication system.

FIG. 1 illustrates a wireless telecommunication system 100. This system can be broken down to blocks as shown in FIG. 1. The human voice fed to the microphone of a mobile station or handset 110 is transmitted through the atmosphere 112 to the base station 114. From the base station 114, the signal is routed to a switching center 116 or rebroadcast 118. Similarly, at the network end the voice information is transmitted from the base station 120 and received by the mobile station or handset 122. Each mobile station 110, 112 and base station 114, 120 have the transmitter/receiver (transceiver) function.

Figure 2:
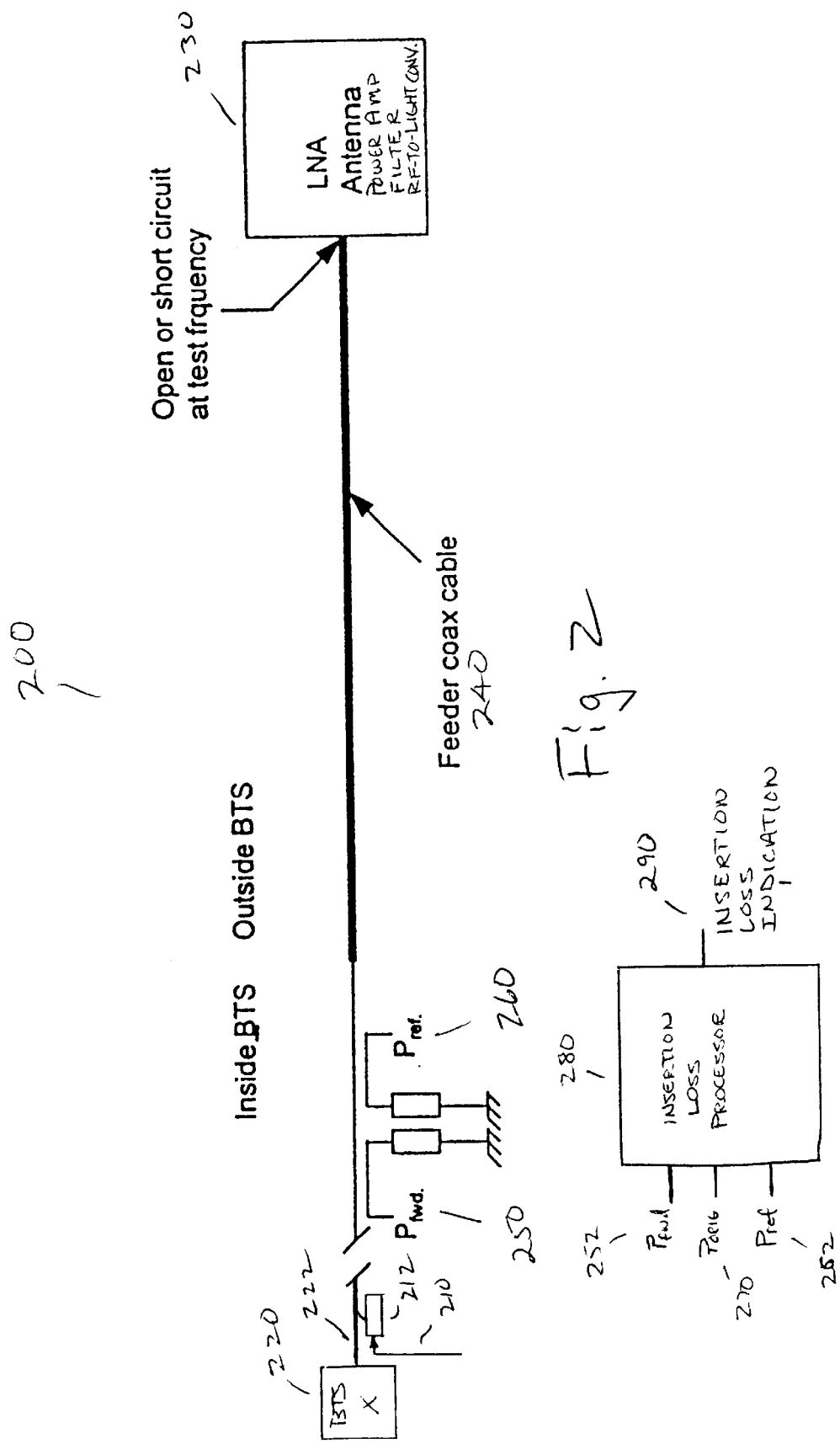
FIG. 2 illustrates a test system for measuring the insertion loss of feeder cables according to the present invention.

FIG. 2 illustrates a test system 200 for measuring the insertion loss of feeder cables according to the present invention. In FIG. 2, a test signal 210 is injected into the system via a coupler 212 in such a manner that it does not effect the performance of the system. The BTS transceiver 220 provides the communication signals 222 to the mobile station (not shown) via the antenna or low noise amplifier (LNA) 230. One characteristic of a cellular communication system is that the signals 222 to the mobile station may be provided using frequency hopping. Further, since mobile stations may be located at different distances with respect to the antenna 230, the signals 222 to the mobile station may exhibit different power levels. For example, in a TDMA cellular system, each mobile is assigned a slot in a TDMA frame. However, the time slot in the TDMA frame may exhibit a change in frequency from frame to frame as well as a change in the power level for that time slot. Thus, at least the amplitude and frequency of the injected signal 210 must be selected so as not to interfere with the normal signals 222 of the system.

The feeder cable 240 is a broadband transmission line, and typically has a 50Ω impedance. In contrast, the antenna or LNA 230 is a narrowband device. Thus, if the injected signal 210 is selected to be outside the frequency band of the antenna or LNA 230, the antenna or LNA 230 will appear to the injected signal 210 as an open or a short, depending on the frequency of the injected signal 210. Accordingly, power will be reflected back toward the BTS transceiver 220.

The amplitude of the injected signal 210 can be recorded from the $P_{fwd}$ port 250. The amplitude of the reflected test signal can be measured at the $P_{ref}$ port 260 provided that the injected signal 210 sees an open or short circuit were the feeder cable 240 interfaces onto the LNA or antenna 230. Those skilled in the art will recognize that the cable may interface to other components also, e.g., a power amplifier, a filter or a radio frequency-to-light converter for use in a fiber optic distribution network. Further, those skilled in the art will recognize that the $P_{fwd}$ port 250 may also be used to inject the signal rather than using the separate coupler 212.

The $P_{fwd}$ amplitude 252 and the $P_{ref}$ amplitude 262 may be processed by an insertion loss processor 280. The difference between the $P_{fwd}$ 250 and the $P_{ref}$ 260 divided by two will be the insertion loss of the feeder cable 240 at the test frequency.

The $S_{21}$ of the cable at the frequency of operation of the base station can be determined by the following formula:

$$S_{21\ feeder\ cable}@\text{BTS freq} = ((P_{fwd} - P_{ref}) \div 2) * k$$

where k is a constant. The reference insertion loss of the feeder cable 240 may be measured during the commissioning of the BTS to provide an $P_{orig}$ amplitude 270 and compared to each subsequent measurement of the insertion loss to provide an indication 290 of whether the insertion loss of the feeder cable 240 has changed.

Since the insertion loss of the feeder cable of every BTS site is different, a method of determining the cable loss will be very useful to network planners who are currently simply estimating the cable loss. The estimation of cables losses is fairly easy if the BTS is a straight mast type of site. However, if the BTS is mounted on a roof top (were nothing is in a straight line) it can be very difficult to estimate the length of the cable. But, the system according to the present invention also provides the network planners with off site diagnostics in the event of a problem because the exact status of the feeder cable loss can be reported in real time. Further, the feeder cable loss can be automatically processed in the base station resulting in a reduction in BTS commissioning complexity and time.

Figure 3:
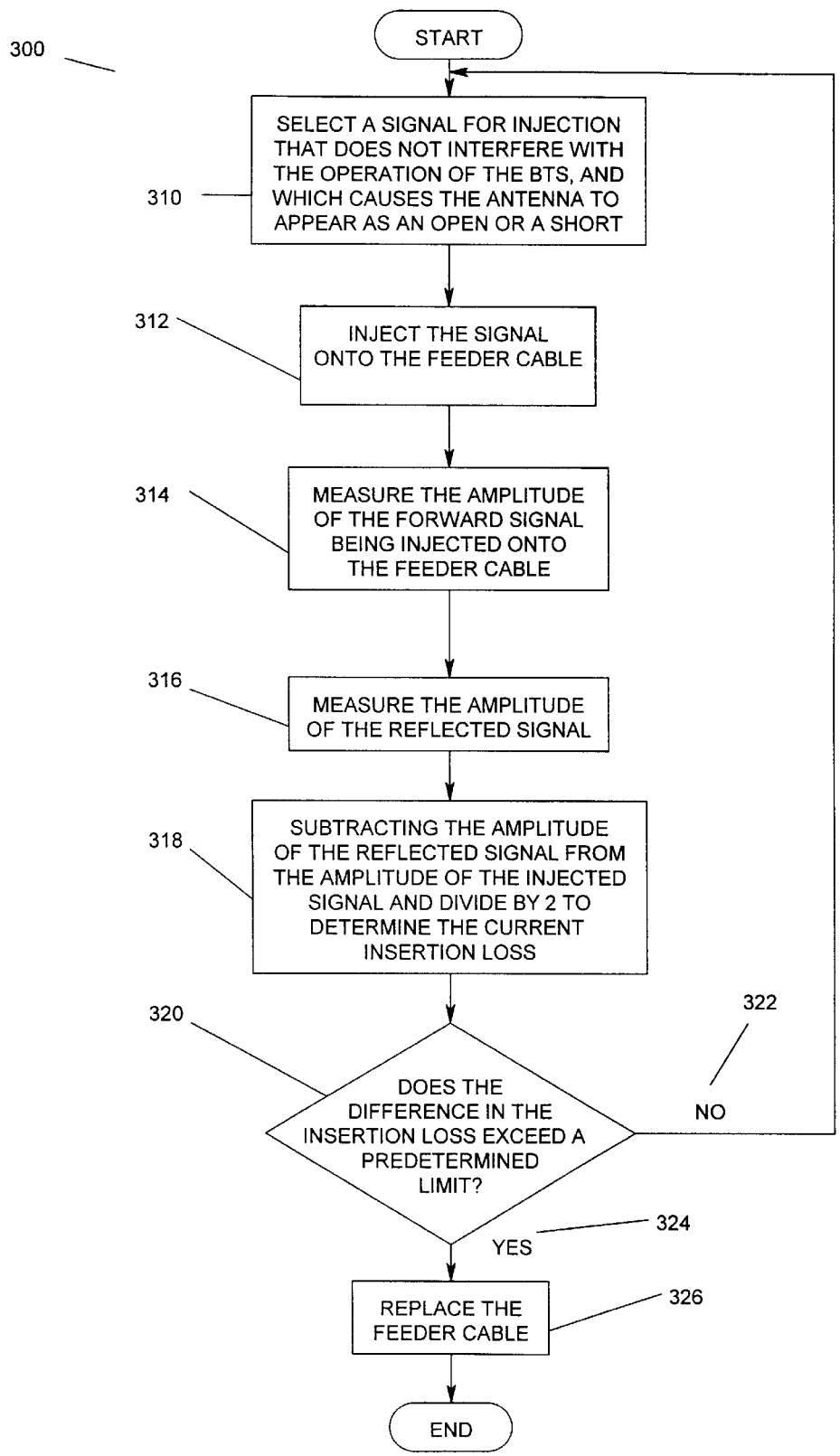
FIG. 3 illustrates a flow chart of the method for detecting a change in the insertion loss of a feeder cable according to the present invention.

FIG. 3 illustrates a flow chart 300 of the method for detecting a change in the insertion loss of a feeder cable according to the present invention. First, a signal is selected for injection that does not interfere with the operation of the BTS, and which cause the antenna to appear as an open or a short 310. From the BTS, the signal that does not interfere with the operation of the BTS is injected into the feeder cable 312. The amplitude of the forward RF signal is measured 314. Then, the amplitude of the reflected RF signal at the BTS is measured 316. The amplitude of the reflected RF signal is subtracted form the forward RF signal and divided by two to determine the current insertion loss of the feeder cable 318. The current insertion loss is compared to the original insertion loss of the feeder cable determined at the commission of the BTS to determine whether the difference between the current insertion loss and the original insertion loss exceeds a predetermined threshold 320. If not 322, the process is repeated. If the difference between the current insertion loss and the original insertion loss exceeds a predetermined threshold 324, the feeder cable is replaced 326.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for measuring the insertion loss of a cable having first and second cable ends respectively connected between a signal source and a narrowband device, comprising:

injecting a non-interfering signal at a first predetermined frequency outside a frequency band of the narrowband device onto the cable proximate the first cable end, wherein injecting the non-interfering signal occurs contemporaneously with a transmission of normal operating signals to the narrowband device at a second predetermined frequency within the frequency band of the narrowband device;

proximate to the signal source, measuring an amplitude of the injected signal;

proximate to the signal source, measuring the amplitude of a reflected signal, the injected signal being reflected by the narrowband device; and calculating a current insertion loss for the cable, wherein calculating the current insertion loss includes determining a median of the difference between the measured amplitudes of the injected and reflected signals.

2. The method of claim 1 further comprising:

comparing the current insertion loss to a previously established reference insertion loss derived for the cable; and determining the cable to be defective when the current insertion loss differs from the previously established reference insertion loss by a predetermined amount.

3. The method of claim 2 further comprising replacing the cable when the current insertion loss differs from the previously established reference insertion loss by the predetermined amount.

4. The method of claim 1 wherein the injecting further comprises selecting a signal for injection having a frequency and power that does not interfere with the normal operating signals and which causes the signal to reflect back from the narrowband device.

5. The method of claim 4 wherein the frequency of the selected signal for injection causes the narrowband device to appear to the selected signal for injection as a short.

6. The method of claim 5 wherein the frequency of the selected signal for injection causes the narrowband device to appear to the selected signal for injection as an open.

7. The method of claim 1 wherein the narrowband device is an antenna.

8. The method of claim 1 wherein the narrowband device is a low noise amplifier.

9. The method of claim 1 wherein the narrowband device is a power amplifier.

10. The method of claim 1 wherein the narrowband device is a filter.

11. The method of claim 1 wherein the narrowband device is a radio-frequency-to-light converter for use in a fiber optic distribution network.

12. A transmission system providing operating signals to a narrowband device over a cable, comprising:

an injection coupler disposed proximate a first end of the cable opposite a second end of the cable coupled to the narrowband device, the coupler injecting a signal onto the cable, the injected signal being selected to have a frequency and power that does not interfere with the existing operating signals and which causes the injected signal to reflect back from the narrowband device;

a forward port, coupled to the cable proximate the injection coupler, the forward port allowing an amplitude of the injected signal to be measured;

a reflection port, coupled to the cable proximate the injection coupler, the reflection port allowing an amplitude of the reflected signal to be measured; and an insertion loss processor coupled to the forward port and the reflection port to calculate a current insertion loss for the cable, wherein calculating the current insertion loss includes determining an average of the amplitude losses of the injected and reflected signals.

13. The transmission system of claim 12 wherein the insertion loss processor further compares the current insertion loss to an original insertion loss to determine whether the difference between the current insertion loss and the original insertion loss exceeds a predetermined threshold.

14. A cellular network, comprising:

a switching center for controlling the routing of calls in the cellular network;

a plurality of a base stations, coupled to the switching center, each base station comprising a base station transceiver, a narrowband device, and a feeder cable coupling the narrowband device and the base station transceiver via first and second cable ends respectively, wherein each of the plurality of base stations further comprise:

an injection coupler disposed at the base station at a position relative to the feeder cable opposite to the narrowband device, the coupler injecting a signal onto the feeder cable, the injected signal being selected to have a frequency outside a frequency band of the narrowband device that does not interfere with existing operating signals of the narrowband device and which causes the injected signal to reflect back from the narrowband device;

a forward port, coupled to the feeder cable proximate the injection coupler, the forward port allowing an amplitude of the injected signal to be measured;

a reflection port, coupled to the feeder cable proximate the injection coupler, the reflection port allowing an amplitude of the reflected signal to be measured; and an insertion loss processor coupled to the forward port and the reflection port to calculate a current insertion loss for the cable, wherein calculating the current insertion loss includes determining an average of the amplitude losses of the injected and reflected signals.

15. The cellular network of claim 14 wherein the insertion loss processor compares the current insertion loss to an original insertion loss to determine whether the difference between the current insertion loss and the original insertion loss exceeds a predetermined threshold.

16. The cellular network of claim 14 wherein the frequency of the injected signal is selected to cause the narrowband device to appear to the injected signal as a short.

17. The cellular network of claim 14 wherein the frequency of the injected signal is selected to cause the narrowband device to appear to the injected signal as an open.

18. The cellular network of claim 14 wherein the narrowband device is an antenna.

19. The cellular network of claim 14 wherein the narrowband device is a low noise amplifier.

20. The cellular network of claim 14 wherein the narrowband device is a power amplifier.

21. The cellular network of claim 14 wherein the narrowband device is filter.

22. The cellular network of claim 14 wherein the narrowband device is a radio-frequency-to-light converter for use in a fiber optic distribution network.

* * * * *